March 1, 1932. J. F. ADAMS 1,847,856

FOCUSING DEVICE FOR MOTION PICTURE PROJECTORS

Filed Dec. 13, 1927 2 Sheets-Sheet 1

WITNESSES:

INVENTOR:
John Francis Adams,

BY
ATTORNEY.

March 1, 1932.  J. F. ADAMS  1,847,856

FOCUSING DEVICE FOR MOTION PICTURE PROJECTORS

Filed Dec. 13, 1927  2 Sheets-Sheet 2

WITNESSES:

INVENTOR:
John Francis Adams,

BY
ATTORNEY

Patented Mar. 1, 1932

1,847,856

UNITED STATES PATENT OFFICE

JOHN FRANCIS ADAMS, OF PHILADELPHIA, PENNSYLVANIA, ASSIGNOR TO SENTRY SAFETY CONTROL CORPORATION, OF PHILADELPHIA, PENNSYLVANIA, A CORPORATION OF DELAWARE

FOCUSING DEVICE FOR MOTION PICTURE PROJECTORS

Application filed December 13, 1927. Serial No. 239,621.

My invention relates to motion picture projectors and has special reference to means for adjusting the lens holder thereof.

Many projectors now in use are focused by means of a gear and rack and the lens holders are then clamped in selected positions. The difficulty with this arrangement lies in the fact that adjustments must be made often and accurately in order to produce proper projection as the lens must be readjusted whenever a different thickness of film is run through the projector and whenever the film is printed on both sides, as in colored films.

As there is always some backlash between the pinion and rack, it is difficult to quickly and accurately adjust the lens holder and, unless securely clamped in adjusted position, it will work out of focus due to the vibration of the projector. The lens holder must be adjusted whenever the lens is cleaned, the position of the reflector in the lamp housing changed, a film of a different thickness used, and whenever the lens is jarred out of adjustment by the vibration of the projector. Thus the operator is forced to perform duties which require constant attention and it is the object of this invention to provide a device which will enable him to adjust the lens holder quickly and accurately and which will secure same against displacement due to the vibration of the projector.

Other objects of the invention are to provide a device which permits a much finer adjustment, is more easily operated, has fewer parts, and is so designed that no alteration to the projector is necessary in order to install same thereon.

Figure 1:
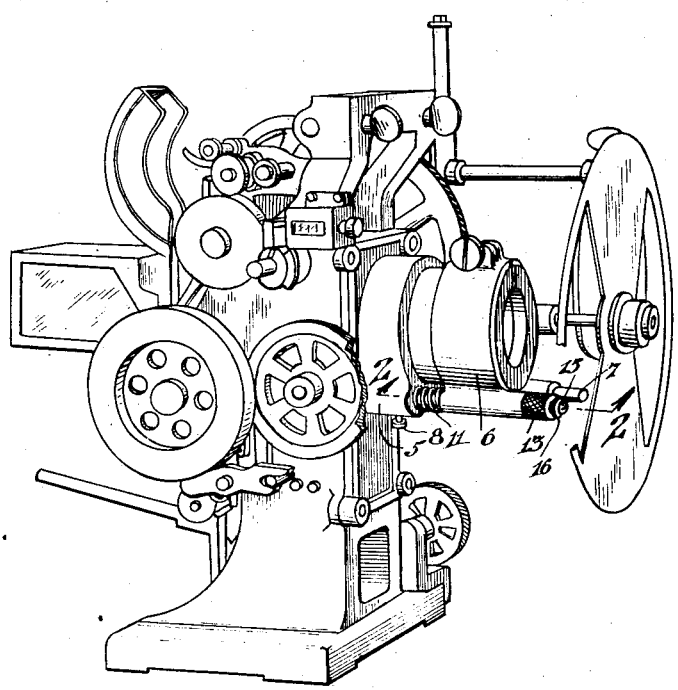
Figure 1 is a perspective view of a motion picture projector upon which my improved adjusting device has been installed.

The projector illustrated in the drawings has a front plate 5 which normally supports a lens holder 6 by means of a pair of guide rods 7 upon which lens holder 6 is slidable and which are secured in front plate 5 by set screws 8. In installing my improved adjusting device upon a projector, I remove one guide rod 7 and substitute therefor a theaded rod 9 which is preferably provided with a V-shaped groove 10 near its inner end into which the point of set screw 8 may enter for fixing rod 9 in place. A coiled spring 11 encircles rod 9 between front plate 5 and lens holder 6 and tends to slide the lens holder on rods 7 and 9 away from front plate 5.

Figure 2:
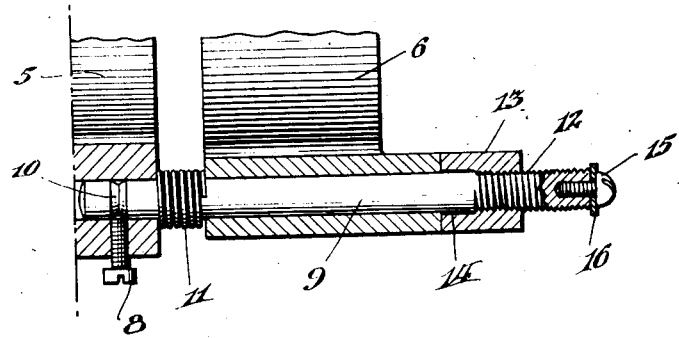
Figure 2 is a fragmentary sectional view through a portion of the projector, as indicated by the line 2—2 on Figure 1, showing the adjusting device in operative position.
Figure 3:
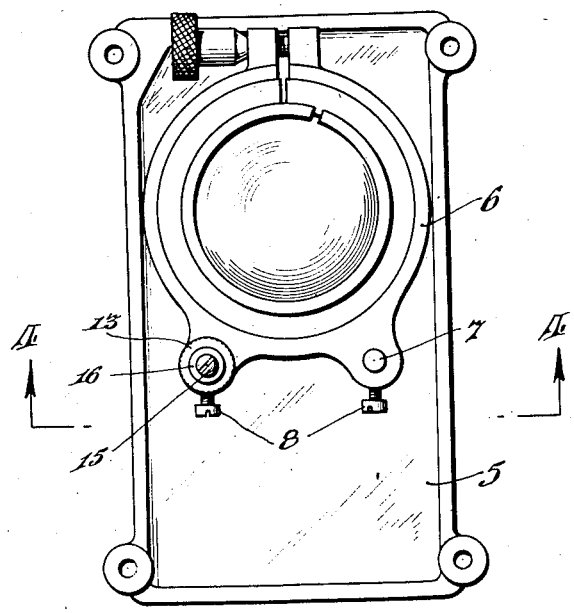
Figure 3 is a front view of the front plate of the projector shown in Figure 1, showing the lens holder and adjusting device in place, and Figure 4 a bottom sectional plan view thereof, taken on line 4—4 on Figure 3.
Figure 4:
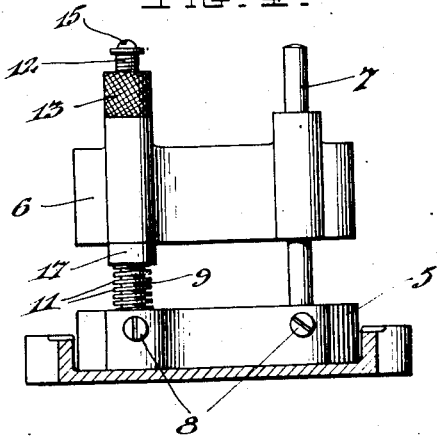

The outer end of rod 9 is provided with a fine thread 12 upon which a nut 13 is threaded into engagement with lens holder 6; nut 13 being provided with a counterbore 14 so that lens holder 6 does not slide over threads 12 when it is in its forwardmost position. In order to prevent nut 13 from being unintentionally removed from rod 9, the outer end of the rod is bored and tapped to receive a screw 15 which may have a large head or be provided with a washer 16 which is slightly larger than the threaded portion of rod 9, as shown in Figure 2.

Ordinarily, a projector is operated with the lens holder pointed downwardly at a slight angle but, under some circumstances, it might be desired to so locate the projector, relatively to the screen, that it would be necessary to point the lens holder upwardly at a slight angle. Under these conditions, the opposite end of rod 9 would be threaded to accommodate nut 13 and spring 11 disposed on rod 9 between lens holder 6 and washer 16. In both cases, nut 13 is adapted to move lens holder 6 against both the action of spring 11 and the force of gravity.

When the projector upon which the device is to be installed is in operation in a very long theatre, it is necessary to position lens holder 6 a considerable distance from front plate 5 in order to focus the pictu upon the screen. Instead of providing a long spring in place of spring 11, one or more collars 17 are provided which are disposed between lens holder 6 and spring 11 so that the same adjusting device may be used on projectors which are to be focused to both long and short distances.

When a portion of the film of a different thickness or a colored section passes the projection aperture, the operator simply has to turn nut 13 in one direction or the other to bring the picture into the proper focus upon the screen, in which position the lens holder will remain due to the action of spring 11 and nut 13 which cannot be affected by the vibration of the projector. It is also to be noted that this arrangement allows a much finer adjustment and that the adjustment can be made in considerably less time than by the customary means now in use.

While I have described one manner of carrying my invention into effect and have shown the device applied to one type of projector, it is to be understood that it may be applied to other types of projectors and to cameras or the like and that modifications of the device may be made without departing from the spirit of the invention, as set forth in the foregoing specification and as hereinafter claimed.

I claim:—

1. Means for horizontally adjusting the lens holder of a motion picture machine relative to its support, comprising a pair of rods fixed in the support, said lens holder being slidably mounted on said rods, one of said rods having a threaded portion on its outer end, a nut on said threaded portion, the other rod being unthreaded, and a spiral spring surrounding said threaded rod between said lens holder and said support for urging said holder against said nut whereby said holder moves longitudinally and without any lateral displacement upon the adjustment of said nut.

2. Means for horizontally adjusting the lens holder of a motion picture machine relative to its support, comprising a pair of rods fixed in the support, said lens holder having sleeves whereby it is slidably mounted on said rods, one of said rods having a threaded portion on its outer end, a nut on said threaded portion, and a spiral spring surrounding said threaded rod between said lens holder and the sleeve slidably mounted on said rod for urging said holder against said nut whereby said holder will move forward or rearward without lateral displacement upon the adjustment of said nut.

In testimony whereof I have signed my name to this specification.

JOHN FRANCIS ADAMS.